(12) United States Patent
Shao et al.

(10) Patent No.: US 11,754,995 B2
(45) Date of Patent: Sep. 12, 2023

(54) INDUSTRIAL INTERNET OF THINGS FOR IDENTIFYING AND PROCESSING MANUFACTURING PROBLEMS, CONTROL METHODS, AND STORAGE MEDIUM

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yaqiang Quan, Chengdu (CN); Yuhao Chen, Chengdu (CN); Lei Zhang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/933,102

(22) Filed: Sep. 17, 2022

(65) Prior Publication Data
US 2023/0072026 A1 Mar. 9, 2023

(30) Foreign Application Priority Data
Jun. 28, 2022 (CN) .......................... 202210738614.4

(51) Int. Cl.
| | |
|---|---|
| *H04L 67/12* | (2022.01) |
| *G05B 19/418* | (2006.01) |
| *G05B 19/406* | (2006.01) |
| *G16Y 10/25* | (2020.01) |

(52) U.S. Cl.
CPC ....... *G05B 19/406* (2013.01); *G05B 19/4184* (2013.01); *H04L 67/12* (2013.01); *G05B 2219/49001* (2013.01); *G16Y 10/25* (2020.01)

(58) Field of Classification Search
CPC ...... G05B 19/4184; H04L 67/12; G16Y 10/25
See application file for complete search history.

(56) References Cited

U.S. PATENT DOCUMENTS

| 11,226,858 B1 * | 1/2022 | Srivastava .......... G06F 11/0778 |
| 11,392,651 B1 * | 7/2022 | McClusky ............ G06F 40/295 |
| 11,606,434 B1 * | 3/2023 | Shao ....................... H04L 67/12 |

(Continued)

FOREIGN PATENT DOCUMENTS

| CN | 104361500 A | 2/2015 |
| CN | 106321318 A | 1/2017 |

(Continued)

*Primary Examiner* — David R Lazaro
(74) *Attorney, Agent, or Firm* — METIS IP LLC

(57) ABSTRACT

The disclosure provides an industrial Internet of Things for identifying and processing manufacturing problems, a control method, and a storage medium. The method includes an industrial Internet of Things for identifying and processing manufacturing problems. The industrial Internet of Things includes an acquisition module, a problem type determination module and a problem solving module, the acquisition module is configured to obtain equipment information and data of product manufacturing problems; the problem type determination module is configured to determine a problem type at least based on the data of the product manufacturing problems; and the problem solving module is configured to determine problem processing data based on the problem type, and solve the problem based on the problem processing data.

5 Claims, 6 Drawing Sheets

(56) References Cited

U.S. PATENT DOCUMENTS

| | | | |
|---|---|---|---|
| 11,625,028 B1* | 4/2023 | Shao | G05B 19/4185 |
| | | | 700/95 |
| 2004/0122859 A1* | 6/2004 | Gavra | H01L 22/20 |
| 2015/0095079 A1* | 4/2015 | Braham | G06Q 10/063112 |
| | | | 705/7.14 |
| 2015/0095331 A1* | 4/2015 | He | G06Q 10/06 |
| | | | 707/736 |
| 2015/0121136 A1* | 4/2015 | Namkoong | G06F 11/0793 |
| | | | 714/15 |
| 2019/0171947 A1* | 6/2019 | Mohan | G06N 5/022 |
| 2019/0243332 A1* | 8/2019 | Kamiguchi | G05B 23/0275 |
| 2019/0273783 A1 | 9/2019 | Shao | |
| 2019/0273784 A1 | 9/2019 | Shao | |
| 2019/0325212 A1 | 10/2019 | Liu et al. | |
| 2020/0068019 A1* | 2/2020 | Tezuka | G16Y 20/10 |
| 2020/0097389 A1* | 3/2020 | Smith | G06F 11/0793 |
| 2020/0333759 A1* | 10/2020 | Kim | G06N 20/00 |
| 2021/0097502 A1 | 4/2021 | Hilleli et al. | |
| 2021/0157312 A1* | 5/2021 | Celia | G01M 13/045 |
| 2021/0157643 A1 | 5/2021 | Shear et al. | |
| 2022/0066429 A1* | 3/2022 | Takahashi | G06F 16/2465 |
| 2023/0072026 A1* | 3/2023 | Shao | G05B 19/406 |

FOREIGN PATENT DOCUMENTS

| | | |
|---|---|---|
| CN | 106533754 A | 3/2017 |
| CN | 107544462 A | 1/2018 |
| CN | 107819817 A | 3/2018 |
| CN | 109240258 A | 1/2019 |
| CN | 109597986 A | 4/2019 |
| CN | 111258995 A | 6/2020 |
| CN | 111696675 A | 9/2020 |
| CN | 113452672 A | 9/2021 |
| CN | 114488988 A | 5/2022 |
| WO | 2022048671 A1 | 3/2022 |

* cited by examiner

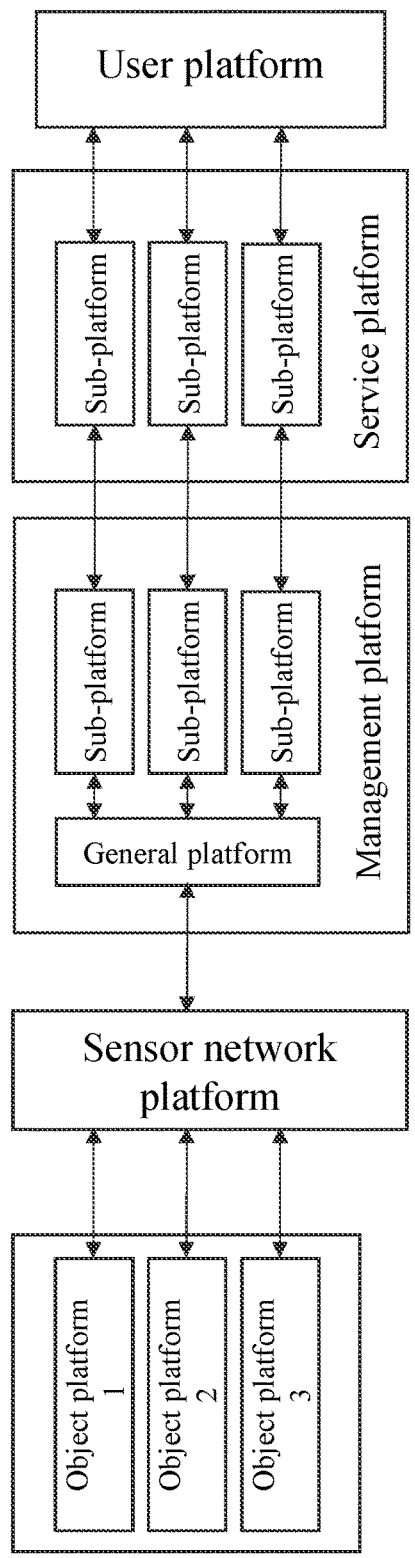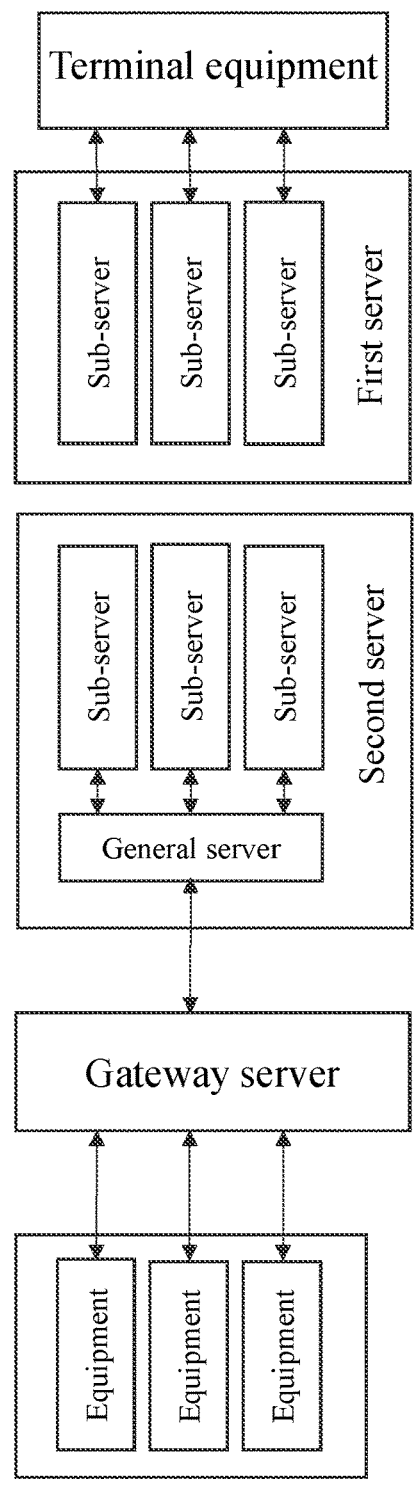
FIG. 2

300

310 — When obtaining the product manufacturing problems, the object platforms package the data of the product manufacturing problems and send the data of the product manufacturing problems to the sensor network platform

320 — The sensor network platform receives the data and identifies the equipment information of the corresponding object platforms, compiles the equipment information and the data of the the product manufacturing problems into a compilation file according to compilation rule, and uploads the compilation file to the general platform of the management platform

330 — The general platform of the management platforms receives the compilation file, extracts the keywords in the data of the product manufacturing problem to form keyword index data, and conducts problem classification analysis based on the keyword index data to obtain one or more analysis results; the analysis results include one or more problem types; matches the one or more analysis results to obtain classification information corresponding to one or more analysis results, and sends the compilation file to the plurality of sub-platforms of management platform corresponding to the classification information based on the classification information

340 — After receiving the compilation file, the plurality of sub-platforms of management platforms conduct similarity matching based on the data of the product manufacturing problems, and send the matching rate that meets the matching requirement to the general platform of the management platform

350 — The general platform of the management platform receives one or more matching rates, sorts all the matching rates, selects the sub-platforms of the N management platforms with the highest matching rate as problem processing platforms, retrieves the problem processing data of the corresponding matching rate in all the problem processing platforms, sorts all the problem processing data according to the matching rate and integrates the equipment information in the compilation file to send to the sensor network platform together, and N denotes an integer greater than or equal to 1

360 — The sensor network platform receives the problem processing data and the equipment information, and sends all the problem processing data to the corresponding object platforms based on the equipment information

370 — The object platforms obtain the problem processing data sorted according to the matching rate, and use the problem processing data to process the problems according to the sorting until the problems are resolved and feed back the processing results

FIG. 3

INDUSTRIAL INTERNET OF THINGS FOR IDENTIFYING AND PROCESSING MANUFACTURING PROBLEMS, CONTROL METHODS, AND STORAGE MEDIUM

CROSS-REFERENCE TO RELATED DISCLOSURES

This application claims priority to Chinese Patent Application No. 202210738614.4, filed on Jun. 28, 2022, and the entire contents of the application are incorporated herein by reference.

TECHNICAL FIELD

The disclosure relates to the technology of Intelligent Manufacturing, particularly to an industrial Internet of Things for identifying and processing manufacturing problems, a control method, and a storage medium.

BACKGROUND

Intelligent Manufacturing (IM) is an integrated human-machine intelligent system composed of intelligent machines and human experts. It may perform intelligent activities during the manufacturing process, such as analysis, reasoning, judgment, conception, and decision-making. The cooperation between humans and intelligent machines is used to expand, extend, and partially replace the brain labor of human experts in the process of manufacturing.

In Intelligent Manufacturing, various types of intelligent manufacturing equipment often produce various product manufacturing problems for various reasons, such as parameters (e.g., temperature, pressure, etc.) regulatory errors, equipment program failures, product or accessory delivery errors, positioning accuracy errors, processing size mismatching and other problems. When there is a problem, the problem is usually sent to the manual problem processing center through monitoring equipment or systems for centralized processing. Due to the large factory area and high number of equipment involved in the intelligent manufacturing, the manufacturing problems are varied in types and complicated in classification and high in number, thus the data that needs to be processed by the processing center is extremely huge and tedious, increasing the data processing pressure and workload of the problem processing center.

In practical use, many of the above problems may be processed or solved by re-updating or replacing data, programs, instructions, secondary processing, re-distribution, etc., with no requirement for manual intervention, thus what needs to do is to identify problems and execute problem solutions. However, due to the large number of equipment and complicated data involved in Intelligent Manufacturing, and the data processing, computing, classification, transmission and other capabilities with huge data, such problems may still not be well handled if the equipment is used to solve them automatically, and the problem processing cost and process may not be reduced or omitted either, which is not conducive to the implementation of Intelligent Manufacturing.

SUMMARY

The technical problem to be addressed by the present disclosure is to provide an industrial Internet of Things for identifying and processing manufacturing problems. The Internet of Things may obtain corresponding keywords through product manufacturing problems by reasonable construction of the Internet of Things structure and processing logic, and use the keywords to identify, classify, and match corresponding problem processing platforms so that most product manufacturing problems may be solved by the Internet of Things structure, the product manufacturing problems may be rapidly and efficiently processed, and the cost and process of problem processing may be simplified.

The present disclosure is implemented through the following technical scheme: the industrial Internet of Things for identifying and processing manufacturing problems, including: an acquisition module, a problem type determination module and a problem solving module. The acquisition module is configured to obtain equipment information and data of product manufacturing problems. The problem type determination module is configured to determine the problem type at least based on the data of the product manufacturing problems. The problem solving module is configured to determine problem processing data based on the problem type, and solve the problems based on the product manufacturing problems processing data.

The disclosure also provides a control method of the industrial Internet of Things for identifying and processing the manufacturing problems based on the industrial Internet of Things for identifying and processing the manufacturing problems, including: obtaining the equipment information and the data of the product manufacturing problems; determining the problem type at least based on the data of the product manufacturing problems; and determining the problem processing data based on the problem type, and solving the product manufacturing problems based on the problem processing data.

The disclosure also provides a computer readable storage medium based on the industrial Internet of Things for identifying and processing the manufacturing problems. The storage medium stores computer instructions, and when the computer instructions are executed by a processor, the control method of the industrial Internet of Things for identifying and processing the manufacturing problems is implemented.

Compared with the prior art, the beneficial effects of the present disclosure are as follows: according to the industrial Internet of Things for identifying and processing the manufacturing problems, the Internet of Things is established based on a five-platform structure. The service platform adopts an independent layout, and different sub-platforms of the service platform correspond to different sub-platforms of management platform, so that emergency processing for manufacturing problems may be provided for the sub-platforms of the corresponding management platform. The management platform adopts a rear sub-platform layout. The general platform of the management platform is used to identify and classify the problems, and then matching is conducted by the sub-platforms of the management platform, and the problem processing data is selected and sent through the general platform of the management platform, and thus the manufacturing problems may be solved based on the keywords without manual participation for execution. Furthermore, the different sub-platforms of the management platform may process different problem types, and may also accurately find the problem processing platform through matching, and thus the data processing pressure and the storage pressure of the general platform and the sub-platforms of the management platform are reduced, and problem solving is more efficient and accurate. Furthermore, with the centralized layout of the sensor network platform, all the data may be processed and sent in a unified manner, which is convenient for data interaction with the general platform of the management platform, also simplifies the data transmission path with the object platforms, and facilitates rapid transmission of the data.

When the present disclosure is used, the product manufacturing problems are subjected to keyword indexing through the general platform of the management platform to classify the product manufacturing problems and match the specific problem type so that the corresponding problem type may be quickly and accurately found, then the sub-platforms of the corresponding management platform of the product manufacturing problems may be found, all the product manufacturing problems may be identified and analyzed, and a basis is provided for problem processing. Meanwhile, the sub-platforms of the management platform further conduct problem matching based on the product manufacturing problems to obtain the problem processing data with higher matching value, and then send the problem processing data to the object platforms to perform corresponding problem processing through the general platform of the management platform and the sensor network platform. By classifying and analyzing the data and finding problem processing platforms, and selecting the problem processing data through a matching method to solve the problems, the product manufacturing problems may be quickly, accurately, and efficiently processed, thereby reducing complicated problem solving process, high cost, large amount of data processing and other problems in the prior art. In addition, data analysis and classification are conducted through the general platform of the management platform, and data matching and processing data providing are conducted through the sub-platforms of the management platform, so that the data processing and storage volume of each platform may be reduced, the efficiency and accuracy of solving problem may also be improved, and the complex process of data processing and transmission may be simplified. Furthermore, in the processing process, when the problems may not be processed, the service platform or the user platform intervenes to solve the problems that may not be solved by the Internet of Things, thus the entire problem processing process of the Internet of Things is improved to ensure that all the problems may be solved well and ensure that all the product manufacturing problems may be reasonably and effectively processed.

BRIEF DESCRIPTION OF THE DRAWINGS

The drawings described herein are used to provide further understanding of the embodiments of the invention, form a part of the application, and do not limit the embodiments of the invention. In the drawings:

FIG. 2 is a structural framework diagram of the industrial Internet of Things for identifying and processing the manufacturing problems according to some embodiments of this disclosure;

FIG. 3 is a flowchart of a control method of the industrial Internet of Things for identifying and processing the manufacturing problems according to some embodiments of this disclosure;

DETAILED DESCRIPTION

In order to make the purpose, technical schemes, and advantages of the present disclosure clearer, the disclosure is further described in detail in combination with the following embodiments and drawings. The schematic embodiments of the disclosure and the descriptions thereof are only intended to explain the invention, and not intended to limit the scope of the disclosure.

Figure 1:
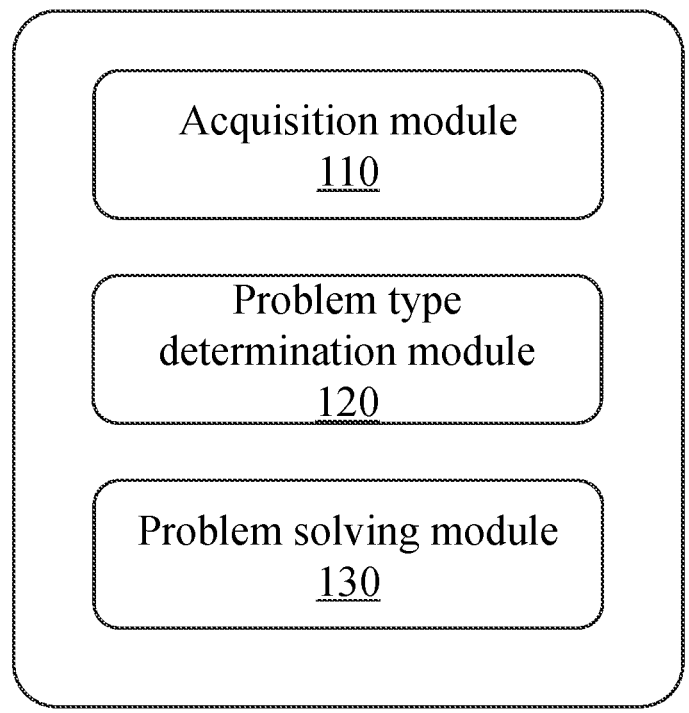
FIG. 1 is a module diagram of a system of the industrial Internet of Things for identifying and processing the manufacturing problems according to some embodiments of this disclosure.

FIG. 1 is the module diagram of a system of the industrial Internet of Things for identifying and processing the manufacturing problems according to some embodiments of this disclosure.

As shown in FIG. 1, an industrial Internet of Things system 100 for identifying and processing the manufacturing problems may include an acquisition module 110, a problem type determination module 120, and a problem solving module 130.

The acquisition module 110 may be configured to obtain equipment information and the data of product manufacturing problems. Object platforms of the industrial Internet of Things for identifying and processing the manufacturing problems may be used as executors. In some embodiments, the equipment information may at least include one or more of the number information, location information or type information of the object platforms. For descriptions of the data of the product manufacturing problems, see FIG. 4 and its corresponding descriptions.

The problem type determination module 120 may be configured to determine the problem type based on the data of the product manufacturing problems. Management platform of the industrial Internet of Things for identifying and processing the manufacturing problems may be used as executors. For descriptions of the problem type, see FIG. 4 and its corresponding descriptions.

The problem solving module 130 may be configured to determine problem processing data based on the problem types, and solve the problems based on the problem processing data. The management platform, the sensor network platform, and the object platforms of the industrial Internet of Things for identifying and processing the manufacturing problems may be used as executors.

It should be understood that the system and modules shown in FIG. 1 may be implemented in various ways.

It should be noted that the description of the system and modules of the industrial Internet of Things for identifying and processing the manufacturing problems above are only for the convenience of disclosure, and may not limit this disclosure within the scope of the embodiments mentioned. It is understandable that for the technical personnel of the art, after understanding the principle of the system, then each module may be arbitrarily combined without departing from this principle, or a subsystem may be constituted to connect with other modules. In some embodiments, the acquisition module 110, the problem type determination module 120, and the problem solving module 130 disclosed in FIG. 1 may be different modules in a system, or a module for implementing functions of two or more modules above. For example, each module may share a storage module, and each module may also have its own storage module. Such variants are within the protection scope of this disclosure.

FIG. 2 is a structural framework diagram of the industrial Internet of Things for identifying and processing the manufacturing problems according to some embodiments of this disclosure.

As shown in FIG. 2, the first embodiment of the present disclosure aims to provide an industrial Internet of Things 200 for identifying and processing the manufacturing problems, including: a user platform, a service platform, management platform, a sensor network platform and object platforms that interact in turn.

The service platform adopts an independent layout, the management platform adopts a rear sub-platform layout, and the sensor network platform adopts a centralized layout. The independent layout means that the service platform is provided with a plurality of independent sub-platforms, which perform data storage, data processing and/or data transmission of different data. The rear sub-platform layout means that the management platform is provided with a general platform and a plurality of sub-platforms. A plurality of sub-platforms respectively store and process different types of data or data of different receiving objects sent by the service platform. The general platform summarizes the data of a plurality of sub-platforms, and transmits the data to the sensor network platform. The centralized layout means that the sensor network platform receives, processes, and sends the data in a unified manner. The object platforms are configured as intelligent management equipment.

FIG. 3 is the flowchart of a control method of the industrial Internet of Things for identifying and processing the manufacturing problems according to some embodiments of this disclosure. In some other embodiments, as shown in FIG. 3, the process 300 includes the following steps. In some embodiments, the process 300 may be executed by the industrial Internet of Things 200 for identifying and processing the manufacturing problems.

Step 310, when obtaining the product manufacturing problems, the object platforms package the data of the product manufacturing problems and send the data of the product manufacturing problems to the sensor network platform.

Step 320, the sensor network platform receives the data and identifies the equipment information of the corresponding object platforms, compiles the equipment information and the data of the product manufacturing problems into a compilation file according to the compilation rule, and uploads the compilation file to the general platform of the management platform. In some embodiments, the equipment information at least includes one or more of the number information, location information, or type information of the object platforms.

In some embodiments, the compilation rule may include: using the equipment information as data items and the data of the product manufacturing problems as data association items, converting the data association items into data files recognized by the management platform, and associating the data files and data items and then compressing together to form a compression file.

Step 330, the general platform of the management platform receives the compilation file, extracts the keywords in the data of the product manufacturing problem to form keyword index data, and conducts problem classification analysis based on the keyword index data to obtain one or more analysis results; the analysis results include one or more problem types; matches one or more analysis results to obtain classification information corresponding to one or more analysis results, and sends the compilation file to the plurality of sub-platforms of the management platform corresponding to the classification information based on the classification information.

In some embodiments, the general platform of the management platform receives the compilation file, extracts the keywords in the data of the product manufacturing problems to form the keyword index data, and conducts problem classification analysis based on the keyword index data to obtain one or more analysis results, the specific flow may be as follows.

The general platform of the management platform receives the compilation file, and then extracts the data of the product manufacturing problems.

The general platform of the management platform extracts the keywords in the data of the product manufacturing problems by using the Python language to form the keyword index data.

comparative analysis is conducted on the keyword index data and a keyword problem association table stored in the general platform of the management platform to find out the problem types associated with the keywords, and one or more problem types are used as the analysis results.

The keyword problem association table is to classify the keywords to its corresponding type based on the keywords, and one or more keywords correspond to one type. The keywords may be "abnormal temperature", "abnormal pressure", "abnormal positioning", "abnormal distribution", etc., the types of which may be "parameter problems", "processing problems", "logistics problems", and so on. The corresponding problem types may be found by the keywords. For example, when the keyword is "abnormal temperature", its possible corresponding problem types are "parameter problem" and "processing problem" based on this keyword. Then the "parameter problem" and "processing problem" may be analyzed as the types of the product manufacturing problems.

In some embodiments, one or more analysis results are matched to obtain the classification information corresponding to one or more analysis results. The compilation file is sent to the plurality of sub-platforms of the management platform corresponding to the classification information based on the classification information, the specific flow may be as follows.

A problem classification table is stored in the general platform of the management platform, the problem classification table at least includes the problem type and the equipment information of the sub-platforms of the management platform used to solve the corresponding problem type.

When the general platform of the management platform obtains one or more analysis results, the equipment information of the sub-platforms of the management platform corresponding to one or more analysis results is obtained based on the problem types.

The general platform of the management platform uses the equipment information of the plurality of sub-platforms of the management platform as the classification information of the problem type, and sends the compilation file to the sub-platform of one or more management platform corresponding to the classification information.

It should be noted that the equipment information of the sub-platforms of the management platform may be the equipment number, equipment name, equipment nameplate information of the sub-platforms of the management platform.

Step 340, after receiving the compilation file, the plurality of sub-platforms of the management platform conduct similarity matching based on the data of the product manufacturing problems, and send the matching rate that meets the matching requirement to the general platform of the management platform.

In some embodiments, after the plurality of sub-platforms of the management platform receive the compilation file, similarity matching is conducted based on the data of the product manufacturing problems, and the matching rate that meets the matching requirements is sent to the general platform of the management platform, the specific flow may be as follows.

All the sub-platforms of the management platform store databases of the product manufacturing problems, and databases of the product manufacturing problems at least include the product manufacturing problems and problem processing data corresponding to the product manufacturing problems.

When the plurality of sub-platforms of the management platform receive the compilation file, the data of the product manufacturing problems in the compilation file are extracted as matching data.

The matching data is matched with the product manufacturing problems in the databases one by one, and several similarity matching results are obtained. All the matching rate data that the matching rate meets the matching requirements is sent to the general platform of the management platform.

It should be noted that the problem processing data is the data used to solve the problem. The data may be the corresponding instructions, or the backup package of the corresponding data. For example, when the product manufacturing problem is abnormal equipment positioning accuracy, the problem processing data may be the equipment positioning accuracy parameter package. In subsequent processing, the equipment may receive the positioning accuracy parameter package to update and replace its corresponding positioning parameters, thereby re-adjusting the positioning accuracy. As another example, when the product manufacturing problem is that the product size is large in processing, the corresponding problem processing data may be a secondary processing instruction. When the subsequent object platform receives the problem processing data, the product may be re-processed based on the secondary processing instruction. Furthermore, the matching requirements are threshold requirements set by the sub-platforms of each management platform for the matching rate. For example, when the threshold requirement is that the matching rate is greater than 80%, it means that the matching rate data with the matching rate greater than 80% may be sent to the general platform of the management platform, and the matching rate data with the matching rate lower than the ratio is considered as a low matching rate and may not be sent.

Step 350, the general platform of the management platform receives one or more matching rates, sorts all the matching rates, selects the sub-platforms of the N management platform with the highest matching rate as problem processing platforms, retrieves the problem processing data of the corresponding matching rate in all the problem processing platforms, sorts all the problem processing data according to the matching rates and integrates the equipment information in the compilation file to send to the sensor network platform together. N is an integer greater than or equal to 1.

Step 360, the sensor network platform receives the problem processing data and the equipment information, and sends all the problem processing data to the corresponding object platforms based on the equipment information.

Step 370, the object platforms obtain the problem processing data sorted according to the matching rate, and use the problem processing data to process the problems according to the sorting until the problems are resolved and feed back the processing results.

In some embodiments, the object platforms obtain the problem processing data sorted according to the matching rate, and use the problem processing data to process the problems according to the sorting until the problems are resolved and feed back the processing results, the specific flow may be as follows.

The object platforms obtain the problem processing data sorted according to the matching rate, and execute the problem processing data as the corresponding instruction packages. When one problem processing data is executed and the product manufacturing problems still exist, the next problem processing data is executed according to the matching rate in a descending manner.

When the product manufacturing problems are solved during the execution process, the object platforms use the corresponding problem processing data as the optimal processing item data to be transmitted to the sensor network platform, and the general platform of the management platform in turn, and the general platform of the management platform obtains the sub-platforms of the corresponding management platform based on the optimal processing item data.

The general platform of the management platform associates the product manufacturing problems and the problem processing data to send to the sub-platform of the corresponding management platform. The sub-platforms of the corresponding management platform store the associated product manufacturing problems, and the problem processing data in the databases of the product manufacturing problems and feed back the storage information to the general platform of the management platform; and the storage information at least includes the product manufacturing problems, the problem processing data and storage time.

It should be noted that the storage time is the time when the product manufacturing problem and the problem processing data are stored in the sub-platforms of the management platform. It is automatically generated when the sub-platforms of the management platform store the product manufacturing problems and the problem processing data.

In some embodiments, the product manufacturing problems may not be overcome by data replacement, instruction execution, etc. For example, engine oil leakage, line and pipeline breakage, damage of key components, etc. require manual intervention to solve the problems.

To this end, when the object platforms use the problem processing data to process the problems and the product manufacturing problems still exist, the unsuccessful processing data is fed back to the sensor network platform. The unsuccessful processing data at least includes the equipment information, the product manufacturing problems, the problem type and all the problem processing platform information.

After receiving the unsuccessful processing data, the sensor network platform converts the data into an unsuccessful data file recognized by the management platform and the service platform, and sends the unsuccessful data file to the general platform of the management platform.

After receiving the unsuccessful data file, the general platform of the management platform reads the problem processing platform information, and sends the unsuccessful data file to the problem processing platform with the highest matching rate.

After receiving the unsuccessful data file, the corresponding problem processing platform sends the unsuccessful data file to the sub-platforms of the corresponding service platform.

After obtaining the unsuccessful data file, the sub-platforms of the corresponding service platform perform the problem handling emergency solution and issue an execution command to the object platforms, and also send the unsuccessful data file to the user platform.

When the problem processing platform may not solve the problems, the sub-platforms of the management platform with the highest matching rate of the product manufacturing problems are selected as the following execution platforms to execute the emergency solution of the corresponding problem items that match the product manufacturing problem and conduct emergency processing in advance, so as to avoid loss. Meanwhile, the data is sent to the user platform, and the user platform may artificially participate in the problem solving or further issue problem solving instructions.

It should be noted that the user platform in this embodiment may be a desktop computer, a tablet, a laptop, a mobile phone, or other electronic equipment capable of implementing data processing and data communication without much restriction. In specific applications, the first server and the second server may use a single server or a server cluster without much restriction. It should be understood that the data processing process mentioned in this embodiment may be processed through the server's processor. The data stored on the server may be stored on the server's storage equipment, such as hard disks and other memory. In specific applications, the sensor network platform may adopt a plurality of groups of gateway servers, or a plurality of groups of smart routers without much restriction. It should be understood that the data processing process mentioned in the embodiments of this application may be processed through the processors of the gateway servers. The data stored in the gateway servers may be stored on the storage equipment of the gateway servers, such as hard disks and SSD memory.

Ordinary technicians skilled in the art may realize that the units and algorithm steps described in the embodiments disclosed in the disclosure may be implemented by electronic hardware, computer software or the combination of them. In order to clearly explain the interchangeability of the hardware and the software, the composition and the steps of each embodiment have been described in general terms by functions in the above description. The execution of these functions in hardware or software depends on the specific application and design constraints of the technical scheme. Professional and technical personnel may use different methods to implement the described functions on each specific application, but this implementation should not be considered to exceed the scope of the disclosure.

In several embodiments provided in this disclosure, it should be understood that the disclosed devices and methods may be implemented in other ways. For example, the device embodiments described above are only schematic. For example, the division of the units is only a logical function division, and there may be another division way in case of actual implementation. For example, a plurality of units or components may be combined or may be integrated into another system, or some features may be ignored or not executed. In addition, the coupling or direct coupling or communication connection between each other shown or discussed may be indirect coupling or communication connection through some interfaces, or may be electrical, mechanical, or other forms of connection.

The units described as separate parts may or may not be physically separate. An ordinary technician skilled in this field may be aware that the units and the algorithm steps described in combination with the embodiments disclosed in the disclosure may be implemented with the electronic hardware, the computer software, or the combination of them. In order to clearly explain the interchangeability of the hardware and the software, the composition and steps of each embodiment have been described in general terms by function in the above description. The execution of these functions in hardware or software depends on the specific application and the design constraints of the technical scheme. Professional and technical personnel may use different methods to implement the described functions on each specific application, but this implementation should not be considered to exceed the scope of the disclosure.

In addition, each functional unit in each embodiment of the present disclosure may be integrated in one processing unit, in the physical existence of each unit separately, or integrated in one unit in terms of two or more units. The above integrated units may be implemented in the form of hardware or the form of software functional units.

If the integrated units are implemented in the form of the software functional units and used as independent products for sales or application, they may be stored in a computer readable storage medium. To this understanding, the technical scheme of the present disclosure essential or contributive to the prior art, or all or part of the technical scheme may be reflected in the form of software products. The computer software product is stored in a storage medium, including several instructions to enable a set of computer equipment (may be a personal computer, a server, or grid equipment, etc.) to execute all or part of the steps of the methods described in each embodiment of the disclosure. The aforementioned storage medium includes: a U disk, a mobile hard disk, read only memory (ROM), random access memory (RAM), a disk or a disc and other media capable of storing program codes.

In the following, the production management of a capsule production line is taken as an example to describe the industrial Internet of Things for identifying and processing the manufacturing problems and the control method thereof.

The capsule production line may include technical processes such as preliminary screening of raw materials, crushing of raw materials, screening of raw materials, fine powder mixing of raw materials, capsule filling, capsule dust cleaning, capsule drying, capsule inspection, weight inspection, etc. The preliminary screening, crushing, and screening of the raw materials may be completed by raw material processing equipment; the fine powder mixing of the raw materials may be completed by raw material powder mixing equipment; the capsule filling may be completed by filling equipment; the capsule dust cleaning may be completed by dust removing and cleaning equipment; and the capsule drying may be completed by drying equipment.

In some embodiments, object platforms may obtain equipment information and the data of product manufacturing problems. Management platform may determine the problem types based on the equipment information and the data of the product manufacturing problems, and key parameters. For more details of the problem type, please refer to FIG. 4 and its related descriptions.

Figure 4:
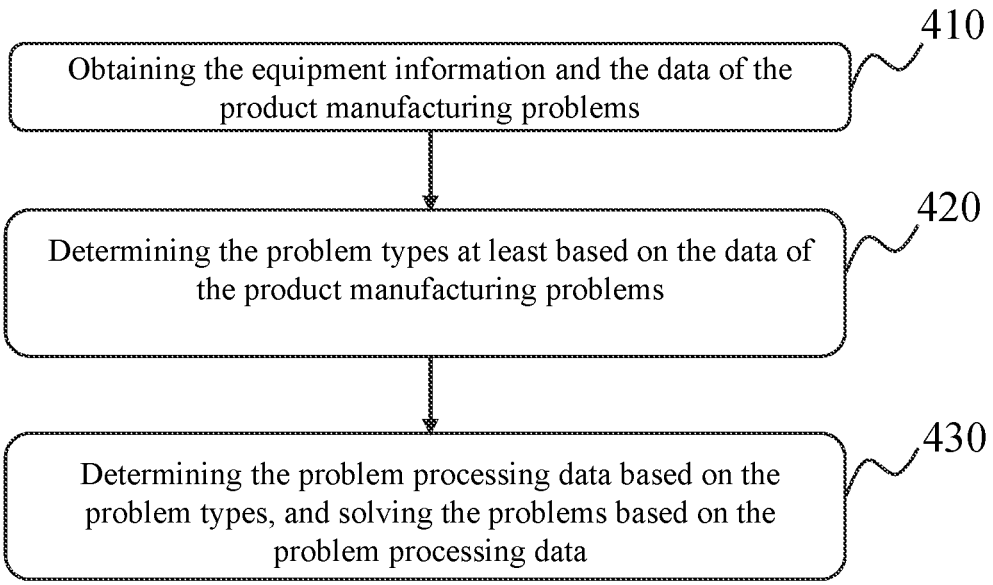
FIG. 4 is a flowchart of control method of the industrial Internet of Things for identifying and processing the manufacturing problems according to some embodiments of this disclosure.

FIG. 4 is an exemplary flowchart of the control method of the industrial Internet of Things for identifying and processing the manufacturing problems according to some embodiments of this disclosure. As shown in FIG. 4, the process 400 includes the following steps. In some embodiments, the process 400 may be executed by the industrial Internet of Things for identifying and processing the manufacturing problems.

Step 410, the sensor network platform obtains the equipment information and the data of the product manufacturing problems.

The equipment information refers to the information reflecting attributes of the equipment having problems. The equipment having problems is the equipment with the manufacturing problems. For example, the equipment having problems may be faulty dust removing and cleaning equipment. In some embodiments, the equipment information at least includes one or more in the number information, location information, or type information of the equipment having problems.

In some embodiments, the processor may store the equipment information in the storage equipment in one-to-one correspondence with its corresponding equipment in advance. The processor may determine the equipment having problems based on the product manufacturing problems, and obtain the equipment information of the equipment based on the equipment having problems. For example, the data of the product manufacturing problems may include that there is dust on the surface of some capsules on a certain production line. Since the dust problem is most likely caused by the dust removing and cleaning equipment with the problem, the processor may determine that the equipment having problems is the dust removing and cleaning equipment on the production line. The processor may extract the equipment information corresponding to the dust removing and cleaning equipment stored in the storage equipment in advance.

The data of the product manufacturing problems refers to the information data of the corresponding problems when problems occur in the production process of the industrial production line. In some embodiments, the data of the product manufacturing problems may include related descriptions of the product manufacturing problems. For example, the product manufacturing problems may include that there is dust on the surface of some capsule, more capsules contain dust and dust is large in amount, dust composition includes more than the due drug ingredients, the processing temperature of the production equipment is not within the set range, the temperature of the production equipment is excessively high, the equipment has abnormal vibration, etc.

In some embodiments, the data of the product manufacturing problems may be generated by the object platforms based on the working conditions of the production equipment and the parameter information of the product, and uploaded to the sensor network platform. In some embodiments, the object platforms may monitor the working status of the production equipment and the parameter information of the product in real time. In response to the situation that the working status of the production equipment and/or the value corresponding to the parameter information of the product is not within the preset normal range, the object platforms may determine that problems occurred in the production process. The processor may generate the data corresponding to the product manufacturing problems based on the working status of the production equipment and/or the parameter information of the product. The working status of the production equipment may include the processing temperature, the processing pressure, the temperature of the equipment, the vibration amplitude of the equipment, etc. The parameter information of the product may include density, mass, surface status of the product, etc.

For example, the object platforms may monitor the temperature of the production equipment based on a temperature detection device. When the processing temperature is monitored to be higher than the preset temperature, the processor may generate the corresponding product manufacturing problem data such as "the temperature of the production equipment is excessively high" or "the temperature of the production equipment is 10° C. higher than the preset temperature". As another example, the object platforms may monitor the weight of capsules produced by the production equipment based on a weight detection device. When the monitored weight of the capsules is not to be within the preset normal range, the processor may generate the corresponding product manufacturing problem data such as "the weight of the capsules is not within the normal range".

Step 420, the problem types are determined at least based on the data of the product manufacturing problems.

The problem type refers to possible causes of the manufacturing problems. In some embodiments, the data of the product manufacturing problem indicating that there is dust on the surface of some capsules is taken as an example, the problem type may include insufficient cleaning water/air flow speed, short dust removing time, excessive amount of dust removing capsules, etc.

In some embodiments, the processor may determine the problem type at least based on the data of the product manufacturing problems. In some embodiments, the processor may extract the keywords in the data of the product manufacturing problems to form the keyword index data, and conducts problem classification analysis based on the keyword index data to obtain one or more analysis results, and the analysis results include one or more problem types. For the relevant contents of determining the problem type by conducting problem classification analysis based on the keyword index data, see FIG. 3 and its related descriptions.

In some embodiments, the processor may determine the problem type based on the data of the product manufacturing problems, the equipment information, and the key parameters through a problem type determination model. For the relevant contents of the problem type determination model, see FIG. 5 and its related descriptions.

The key parameters are information such as the operating parameters of the equipment having problems and the same equipment on other production lines. In some embodiments, the data of the product manufacturing problems indicating that there is dust on the surface of some capsules is taken as an example, the key parameters may include the cleaning water/air flow speed of the dust removing and cleaning equipment on each production line, the crushing pressure of the raw material processing equipment, and stirring speed and time of raw material powder mixing equipment, etc.

Step 430, the problem processing data is determined based on the problem type, and the problems are solved based on the problem processing data.

The problem processing data refers to the data information formed by the method for solving the product manufacturing problems.

In some embodiments, the processor may determine the problem processing data based on the problem types and solve the problems based on the problem processing data. In some embodiments, the processor may determine the problem processing data based on the problem processing table. The problem processing table may include the problem types and the corresponding problem processing data. In some embodiments, one type of problem may be corresponding to one or more problem processing data. In some embodiments, the processor may also determine the problem processing data corresponding to the current type of problem based on historical problem types and corresponding historical problem process data. In some embodiments, the processor may process the product manufacturing problems based on the problem processing data. In some embodiments, if one type of problem corresponds to a plurality of problem processing data, when the first problem processing data may not solve the product manufacturing problems, the processor automatically retrieves the second problem processing data to process the product manufacturing problems until the problems are solved. For more details of determining the problem processing data based on the problem type, and solving the problems based on the problem processing data, please refer to FIG. 2 and FIG. 3 and related descriptions.

In some embodiments of this disclosure, the accuracy of the problem type determination results may be effectively improved by accurately determining the problem type, thereby making the determined problem processing data more accurate and improving the efficiency of problem solving.

It should be noted that the above descriptions of the process 400 is for examples and illustration only, and does not restrict the application scope of this disclosure. Technicians skilled in the art may make various modifications and changes to the process 400 under the guidance of this disclosure. However, these modifications and changes are still within the scope of this disclosure. For example, the process 400 could also include post-processing steps.

Figure 5:
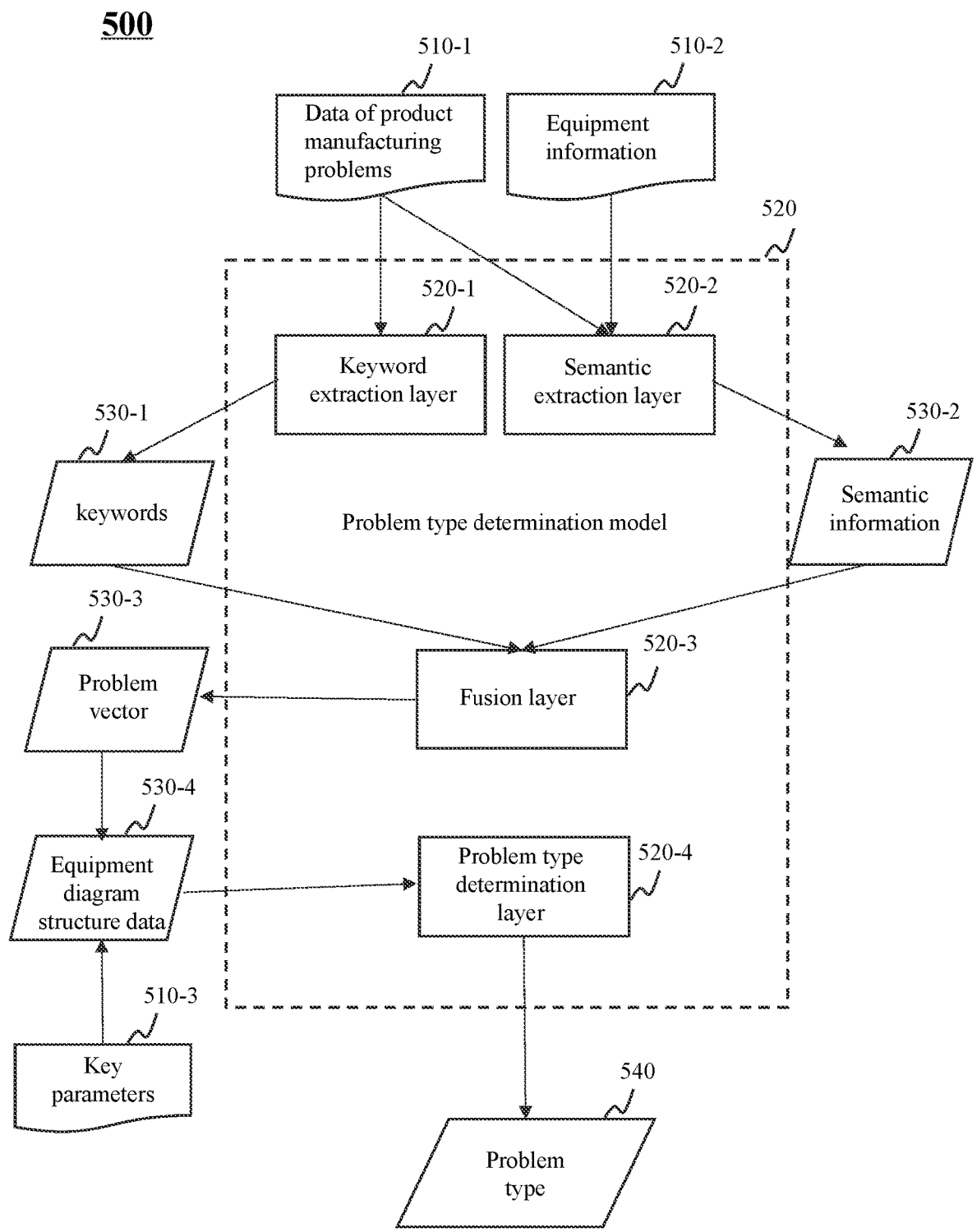
FIG. 5 is an exemplary flowchart for determining the problem type based on the problem type determination model according to some embodiments of this disclosure.

FIG. 5 is an exemplary flowchart 500 of determining the problem type based on the problem type determination model according to some embodiments of this disclosure.

As shown in FIG. 5, in some embodiments, the problem type determination model 520 may be a machine learning model, which may include a keyword extraction layer 520-1, a semantic extraction layer 520-2, a fusion layer 520-3, and a problem type determination layer 520-4.

In some embodiments, the keyword extraction layer 520-1, the semantic extraction layer 520-2, the fusion layer 520-3, and the problem type determination layer 520-4 may be deep learning neural network models. Exemplarily, the keyword extraction layer 520-1 and the fusion layer 520-3 may include Convolutional Neural Networks (CNN), Deep Neural Networks (DNN), and Recurrent Neural Network (RNN), or combination thereof. The semantic extraction layer 520-2 may include Bidirectional Encoder Representations from Transformers (BERT). The problem type determination layer 520-4 may include Graph Neural Network (GNN).

In some embodiments, the keyword extraction layer 520-1 may determine the keywords 530-1 based on the data 510-1 of the product manufacturing problems. The input of the keyword extraction layer 520-1 may be the data 510-1 of the product manufacturing problems, and the output of the keyword extraction layer 520-1 may be the keywords 530-1.

The keywords may refer to words in the data of product manufacturing problems that may characterize the characteristics of the problems. For example, if the data of the product manufacturing problems is "there is dust on the surface of some capsules, there are more capsules with dust, and the amount of dust is large; the dust composition includes more than the due drug ingredients", then the corresponding keywords may be "[$a_1$]", where $a_1$ represents dust.

In some embodiments, the semantic extraction layer 520-2 may determine semantic information 520-2 based on the data 510-1 of the product manufacturing problems and the equipment information 510-2. The input of semantic extraction layer 520-2 may be the data 510-1 of the product manufacturing problems and the equipment information 510-2, and the output of semantic extraction layer 520-2 may be the semantic information 530-2.

In some embodiments, the semantic information refers to the encoding data or vector form data that may reflect the data of the product manufacturing data and the equipment information. For example, if the data 510-1 of the product manufacturing problems is that "there is dust on the surface of some capsules, there are more capsules with dust, and the amount of dust is large; the dust composition includes more than the due drug ingredients", and the equipment information 510-2 is "the dust removing and cleaning equipment numbered 03". Then the semantic extraction layer 520-2 determines the semantic information 520-2 as "[u1, u2, u3, u4]" based on the data 510-1 of the product manufacturing problems and the equipment information 510-2, where u1 represents the dust removing and cleaning equipment 03, u2 represents a large number of capsules, u3 represents a large amount of dust, and u4 represents other ingredients.

In some embodiments, the fusion layer 520-3 may determine the problem vector 530-3 based on the keywords 530-1 and the semantic information 530-2. The input of the fusion layer 520-3 may be keywords 530-1 and the semantic information 530-2, and the output of the fusion layer 520-3 may be the problem vector 530-3.

In some embodiments, the problem vector may be a vector formed by fusion of the keywords and the semantic information. For example, the problem vector may be a vector that is directly spliced by the keywords and the semantic information. For example, if the keywords 530-1 extracted by the keyword extraction layer 520-1 based on the data 510-1 of the product manufacturing problems is "[$a_1$]", the semantic information 530-2 extracted by the semantic extraction layer 520-2 based on the data 510-1 of the product manufacturing problems and the equipment information 510-2 is "[u1, u2, u3, u4]", then the result of the fusion layer 520-3 outputted by fusing the keywords 530-1 and the semantic information 530-2 may be "[$a_1, u_1, u_2, u_3, u_4$]".

In some embodiments, the problem type determination layer 520-4 may determine the problem types 540 based on the equipment diagram structure data 530-4. The input of the problem type determination layer 520-4 may be the equipment diagram structure data 530-4, and the output of the problem type determination layer 520-4 may be the problem type 540.

In some embodiments, the equipment diagram structure data 530-4 may be determined at least based on the problem vector 530-3 and key parameters 510-3. For more details of the equipment diagram structure data 530-4, please refer to FIG. 6 and its related descriptions.

In some embodiments, the problem type determination model 520 may be obtained based on joint training of the keyword extraction layer 520-1, the semantic extraction layer 520-2, the fusion layer 520-3, and the problem type determination layer 520-4. The training samples of the problem type determination model 520 may include data of a plurality of groups of sample product manufacturing problems, sample equipment information, and sample equipment key parameters. Tags may be corresponding problem types, and the tags may be obtained based on manual annotation. In some embodiments, the data of the sample product manufacturing problems is inputted into the keyword extraction layer in the problem type determination model to obtain the output keywords of the keyword extraction layer; the data of the sample product manufacturing problems and the sample equipment information are inputted into the semantic extraction layer in the problem type determination model to obtain the output semantic information of the semantic extraction layer; the keywords and the semantic information are inputted into the fusion layer of the problem type determination model to obtain the output problem vector of the fusion layer; the determined equipment diagram structure data such as the problem vector, the key parameters, etc. is input into the problem type determination layer in the problem type determination model to obtain the output problem type of the problem type determination layer. The output problem type and the tags of the problem type determination layer are utilized to construct a loss function, and the parameters of the keyword extraction layer, the semantic extraction layer, the fusion layer, and the problem type determination layer are iteratively updated simultaneously based on the loss function. When the loss function meets the preset conditions (e.g., the loss function converges, or the loss function value is less than the preset value), the model training is completed, and the trained initial problem type determination model is obtained, and the problem type determination model 520 and the trained initial problem type determination model have the same model structure.

In some embodiments of this disclosure, the parameters of the problem type determination model 520 are obtained by the above training method. In some cases, it is conducive to solving the problem that is difficult to obtain the tags when training the keyword extraction layer 520-1, the semantic extraction layer 520-2, the fusion layer 520-3, and the problem type determination layer 520-4 separately, which may not only reduce the required samples, but also improve training efficiency.

The problem types are determined through the problem type determination model, and the data of the product manufacturing problems, the equipment information and the key parameters are inputted into the problem type determination model to determine the problem type. The accuracy of the determined problem type is significantly improved, thus the problem processing data may be more accurately determined and the problems may be more accurately solved, the unnecessary processing process is reduced, and the processing time, manpower, and material resources are saved.

Figure 6:
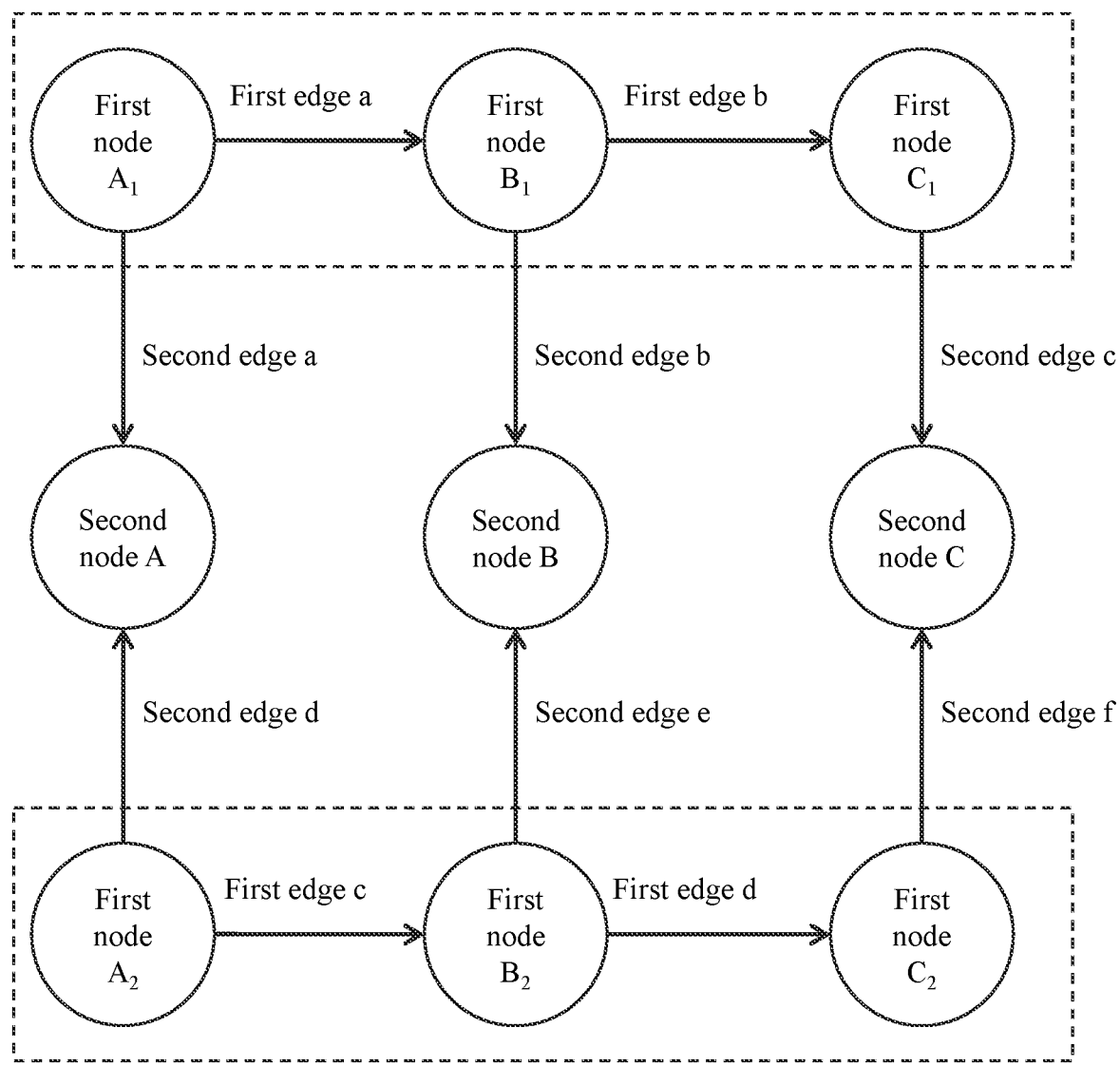
FIG. 6 is a schematic diagram of equipment diagram structure data according to some embodiments of this disclosure.

FIG. 6 is a schematic diagram of the equipment diagram structure data 530-4 according to some embodiments of this disclosure.

In some embodiments, as shown in FIG. 5, the processor may at least determine the equipment diagram structure data 530-4 based on the problem vector 530-1 and the key parameters 510-3.

In some embodiments, the equipment diagram structure data 530-4 is a data structure composed of nodes and edges. The edges connect the nodes, and the nodes and the edges may have attributes.

In some embodiments, the nodes of the equipment diagram structure data may include first nodes and second nodes, the first nodes may be equipment nodes, and the second nodes may be equipment type nodes. For example, as shown in FIG. 6, the first nodes may include a first node $A_1$, a first node $B_1$, a first node $C_1$, a first node $A_2$, a first node $B_2$, and a first node $C_2$. The second nodes may include a second node A, a second node B, and a second node C.

In some embodiments, the first nodes may correspond to the equipment. For example, as shown in FIG. 6, the first node $A_1$ may be the filling equipment on the first production line; the first node $B_1$ may be the dust removing and cleaning equipment on the first production line; the first node $C_1$ may be the drying equipment on the first production line; the first node $A_2$ may be the filling equipment on the second production line; the first node $B_2$ may be the dust removing and cleaning equipment on the second production line; the first node $C_2$ may be the drying equipment on the second production line. The first production line and the second production line are configured to produce different types of capsule products. The attributes of the first nodes may reflect the relevant characteristics of the equipment. For example, the attributes of the first nodes may include the problem vectors and the key parameters, the problem vectors may be obtained based on the fusion layer 520-3 of the problem type determination model. For more details about the equipment information and the key parameters, see FIG. 4 and its related descriptions.

In some embodiments, the second nodes may correspond to the equipment types. For example, as shown in FIG. 6, the second node A may be loading type equipment, the second node B may be cleaning type equipment, and the second node C may be post-processing type equipment. The attributes of the second nodes may include the function of the equipment corresponding to the equipment type. For example, the attributes of the second node A may be "assembly material", the attributes of the second node B may be "cleaning product", and the attributes of the third node C may be "post-processing the product".

In some embodiments, the edges of the equipment diagram structure data may include first edges and second edges. The first edges may be configured to connect the first nodes based on the production order between the first nodes on the production line. The first edges are one-way edges indicating that the previously used first node points to the following used first node. The second edges may be configured to connect the first nodes and the second nodes based on the type matching relationship between the equipment corresponding to the first nodes and the equipment types corresponding to the second nodes. For example, as shown in FIG. 6, the first edges may include a first edge a, a first edge b, a first side c, and a first side d, and the second edges may include a second edge a, a second edge b, a second edge c, a second edge d, a second edge e, and a second edge f.

In some embodiments, the edge attributes of the first edges may include the time interval between the initial time of the production process corresponding to the two first nodes connected by the first edges. For example, as shown in FIG. 6, the first edge may include the first edge a and the first edge b. The two first nodes connected by the first edge a are the first node $A_1$ and the first node $B_1$ respectively. The two first nodes connected by the first edge b are the first node $B_1$ and the first node $C_1$. If the working time of the production process corresponding to the first node $A_1$ is 14: 00-14:28, the working time of the production process corresponding to the first node $B_1$ is 14: 32-14:48, and the working time of the production process corresponding to the first node $C_1$ is 14: 57-15:33, then the attributes of the first edge a may be "a time interval of 32 minutes", and the attributes of the first edge b may be "a time interval of 25 minutes."

In some embodiments, the edge attributes of the second edges may include the service life and the failure history of the equipment corresponding to the first nodes connected by the second edges. The failure history may include failure time, type of failure, maintenance results, etc. For example, as shown in FIG. 6, the edge attributes of the second edge a may be the service life of 10 years of the equipment corresponding to the first node $A_1$. The failure history of the equipment corresponding to the first node $A_1$ may include: Dec. 31, 2025, circuit failure has been repaired; Jan. 10, 2026, abnormal vibration amplitude of the body has been repaired, etc.

In some embodiments, the equipment diagram structure data 530-4 may be determined at least based on the problem vectors 530-3 and the key parameters 510-3. For example, as shown in FIG. 6, if the equipment having problems is the dust removing and cleaning equipment on the first production line, the dust removing and cleaning equipment on the first production line of the equipment diagram structure data 530-4 is the first node $B_1$. The attributes of the first node $B_1$ include "the problem vectors: $[a_1, u_1, u_2, u_3, u_4]$; the key parameters: the cleaning gas flow rate of the dust removing and cleaning equipment corresponding to the first node $B_1$ corresponding to the equipment having the problems and the second node $B_2$ corresponding to the same equipment on other production lines is 5 m/s". Then the problem type outputted by the problem type determination layer 520-4 based on the equipment diagram structure data 530-4 may be "insufficient cleaning gas flow speed".

In some embodiments, as shown in FIG. 5, the processor may determine the problem types 540 by inputting the equipment diagram structure data 530-4 into the problem type determination layer 520-4. In some embodiments, the problem type determination layer may determine the problem types 540 based on the first nodes corresponding to the equipment having the problems in the equipment diagram structure data 530-4. For example, as shown in FIG. 6, the equipment having the problems may be the dust removing and cleaning equipment on the first production line. If the first node corresponding to the dust removing and cleaning equipment is the first node $B_1$, the problem type determination layer 520-4 may determine the problem types 540 based on the first node $B_1$.

The equipment diagram structure data described in some embodiments of this disclosure is used as the input of the problem type determination layer 520-4 of the problem type determination model. Thus, when analyzing the problem type of each equipment, the information of the relevant equipment is referred, making the judgment results more accurate.

This disclosure provides a computer readable storage medium. The storage medium may be configured to store computer instructions. After the computer reads the computer instructions in the storage medium, the computer executes the control method of the industrial Internet of Things for identifying and processing the manufacturing problem.

Having described the basic concepts above, it is clear that the above detailed disclosures are intended only as examples for the technicians skilled in this field, and do not form the qualification of this disclosure. Although not explicitly stated herein, this disclosure may be subjected to various modifications, improvements and corrections by the technicians skilled in this field. Such modifications, improvements and corrections are recommended in this disclosure and therefore remain within the spirit and the scope of the exemplary embodiments of this disclosure.

Meanwhile, this disclosure uses specific words to describe the embodiments of this disclosure. For example, "one embodiment", "one implementation example", and/or "some embodiments" means a characteristic, structure or characteristics related to at least one embodiment of this disclosure. Therefore, it should be emphasized and noticed that two or more references in this disclosure to "one implementation example" or "one embodiment" or "an alternative embodiment" that are mentioned in different positions do not necessarily refer to the same embodiment. Furthermore, some features, structures, or characteristics of one or more embodiments in this disclosure may be properly combined.

In addition, unless expressly stated in the claims, the order of the processing elements and sequences, the use of alphanumeric numbers, or the use of other names described in this disclosure shall not be used to limit the order of processes and methods of this disclosure. Although in the above disclosure, some embodiments that are currently considered useful are discussed through various examples, it should be understood that the details are intended only for explanation, the additional claims are not limited to the implementation examples of the disclosure. Instead, the claims are intended to cover all the corrections and equivalent combinations that meet the essence and the scope of the embodiments of this disclosure. For example, although the implementation of various components described above may be embodied in a hardware device, it may also be implemented by a software solution only, e.g., installing the described system on an existing server or mobile equipment.

Similarly, it should be noted that in order to simplify the statement of the disclosure of the disclosure to help the understanding of one or more invention embodiments, sometimes a plurality of characteristics in the above disclosure of the embodiments of the disclosure will be attributed to one embodiment, drawing or description thereof. However, this disclosure method does not mean that the characteristics required by the object of this disclosure are more than the characteristics mentioned in the claims. Rather, the characteristics of the embodiments may lie in less than all the characteristics of a single foregoing disclosed embodiment.

Some embodiments use numbers with description components and attributes. It should be understood that the numbers used for embodiments described use the modification words "approximately", "similar" or "generally" to come to some examples. Unless otherwise stated, "approximately", "similar" or "generally" indicates a ±20% variance in the figures staged. Correspondingly, in some embodiments, the value parameters used in the disclosure and the claims are approximate values which may be changed according to the characteristics of individual embodiments. In some embodiments, the numerical parameters should consider the effective digits specified and use the method of general digits. Although the range of values and parameters used to confirm its range breadth in some embodiments of this disclosure are approximate values, in the specific embodiments, the setting of such values is as accurate as possible within the feasible range.

For each patent, patent application, patent application disclosure and other materials cited for this disclosure, such as articles, books, descriptions, publications, documents, etc., the entire contents are hereby incorporated into this disclosure for reference. The historical application documents that are inconsistent with or conflict with the contents of the disclosure are excluded, as are the documents with the most extensive and limited claims to this disclosure (currently or later attached to this disclosure). It should be explained that if the use of disclosure, definition, and/or terminologies in the materials attached to this disclosure is inconsistent or conflicts with the contents described in this disclosure, the use of the disclosure, definition and/or terminologies of this disclosure shall prevail.

Finally, it should be understood that the embodiments described in this disclosure are only used to illustrate the principles of the embodiments of this disclosure. Other variants may also belong to the scope of this disclosure. Therefore, as examples rather than restrictions, the alternative configurations of the embodiments of this disclosure may be consistent with the instruction of this disclosure. Correspondingly, the embodiments of this disclosure are not restricted to those specifically introduced and described in this disclosure.

What is claimed is:

1. An industrial Internet of Things system for identifying and processing manufacturing problems based on keywords, comprising: a user platform, a service platform, a management platform, a sensor network platform, and an object platform that interact in turn, wherein the service platform adopts an independent layout, the management platform adopts a rear sub-platform layout, and the sensor network platform adopts a centralized layout; the independent layout means that the service platform is provided with a plurality of independent sub-platforms, which carry out data storage, data processing and/or data transmission for different data; the rear sub-platform layout means that the management platform is provided with a general platform and a plurality of sub-platforms, and the plurality of sub-platforms store and process data of different types or data of different receiving objects sent by the service platform, the general platform summarizes data of the plurality of sub-platforms and then stores and processes the data of the plurality of sub-platforms and transmits the data of the plurality of sub-platforms to the sensor network platform; the centralized layout means that the sensor network platform receives, processes and sends the data in a unified manner; and the object platform is configured as intelligent management equipment;

when the object platform obtains product manufacturing problems, the object platform packages data of the product manufacturing problems and sends the data of the product manufacturing problems to the sensor network platform;

the sensor network platform receives the data of the product manufacturing problems and identifies equipment information of a corresponding object platform, and complies the equipment information and the data of the product manufacturing problems into a compilation file in accordance with a compilation rule, and uploads the compilation file to the general platform of the management platform;

the general platform of the management platform receives the compilation file, extracts out keywords in the data of the product manufacturing problems to form keyword index data, conducts comparative analysis on the keyword index data and a keyword problem association table stored in the general platform of the management platform to find out problem types associated with the keywords, and uses one or more problem types as analysis results, the general platform of the management platform stores a problem classification table, and the problem classification table includes at least the problem types and the equipment information of sub-platforms of the management platform for solving the corresponding problem types; when the general platform of the management platform obtains one or more analysis results, the general platform of the management platform obtains the equipment information of the sub-platforms of the management platform corresponding to the one or more analysis results based on the problem types; and the general platform of the management platform takes the equipment information of the plurality of sub-platforms of the management platform as classification information of the problem types, and sends the compilation file to the plurality of sub-platforms of the management platform in the classification information;

the sub-platforms of the management platform store databases of the product manufacturing problems, and the databases of the product manufacturing problems includes at least the product manufacturing problems and problem processing data corresponding to the product manufacturing problems; when receiving the compilation file, the plurality of sub-platforms of the management platform respectively extract the data of the product manufacturing problems in the compilation file as matching data; the plurality of sub-platforms of the management platform matches the matching data and the product manufacturing problems in the database of the product manufacturing problem one by one to obtain several similarity matching results, and send all the matching data with a matching rate meets a matching requirement to the general platform of the management platform;

the general platform of the management platform receives one or more matching rates, sorts all the matching rates, selects N sub-platforms of the management platform with a highest matching rate as problem processing platforms, retrieves problem processing data of corresponding matching rates of all the problem processing platforms, sorts all the problem processing data according to the matching rate and integrates the equipment information in the compilation file to send to the sensor network platform together, wherein N is an integer greater than or equal to 1;

the sensor network platform receives the problem processing data and the equipment information, and sends all the problem processing data to the corresponding object platform based on the equipment information; and the object platform obtains the problem processing data sorted according to the matching rate, uses the problem processing data as a corresponding instruction package to execute, and executes a next question processing data according to a descending order of the matching rates when the product manufacturing problems still exist after one problem processing data is executed;

when the product manufacturing problems are solved during execution, the object platform uses the corresponding problem processing data as processing optimal item data to be transmitted to the sensor network platform and the general platform of the management platform in turn, and the general platform of the management platform obtains the sub-platforms corresponding to the management platform based on the processing optimal item data; and the general platform of the management platform associates the product manufacturing problems and the problem processing data and sends the product manufacturing problems and the problem processing data to the corresponding sub-platforms of the management platform, and the corresponding sub-platforms of the management platform stores the associated product manufacturing problems and the associated problem processing data to the databases of the product manufacturing problems and feeds back storage information to the general platform of the management platform; and the storage information includes at least the product manufacturing problems, the problem processing data and storage time.

2. The industrial Internet of Things system for identifying and processing the manufacturing problems based on the keywords of claim 1, wherein the equipment information includes at least one or more of number information, location information, or type information of the object platform.

3. The industrial Internet of Things system for identifying and processing the manufacturing problems based on the keywords of claim 1, wherein the compilation rule includes: taking the equipment information as data items and the data of the product manufacturing problems as data association items, transforming the data association items into data files recognized by the management platform, associating the data files with the data items and compressing the data files with the data items to form the compilation file.

4. The industrial Internet of Things system for identifying and processing the manufacturing problems based on the keywords of claim 1, wherein
when the object platform uses the problem processing data to process the manufacturing problems and the product manufacturing problems still exist, the object platform feeds back unsuccessfully processed data to the sensor network platform, wherein the unsuccessfully processed data includes at least the equipment information, the product manufacturing problems, the problem types, and all problem processing platform information;
the sensor network platform receives the unsuccessfully processed data and then converts the unsuccessfully processed data into an unsuccessful data file recognized by the management platform and the service platform, and sends the unsuccessful data file to the general platform of the management platform;
the general platform of the management platform receives the unsuccessful data file and then reads the problem processing platform information, and sends the unsuccessful data file to a problem processing platform with the highest matching rate;
the corresponding problem processing platform receives the unsuccessful data file and then sends the unsuccessful data file to the sub-platforms of the corresponding service platform; and
the sub-platforms of the corresponding service platform obtain the unsuccessful data file and then execute a problem processing emergency solution and issue an execution command to the object platform, and simultaneously send the unsuccessful data file to the user platform.

5. A control method of an industrial Internet of Things for identifying and processing manufacturing problems based on keywords, wherein the industrial Internet of Things for identifying and processing the manufacturing problems includes a user platform, a service platform, a management platform, a sensor network platform, and an object platform that interact in turn;
the service platform adopts an independent layout, the management platform adopts a rear sub-platform layout, and the sensor network platform adopts a centralized layout; the independent layout means that the service platform is provided with a plurality of independent sub-platforms, which carry out data storage, data processing and/or data transmission for different data; the rear sub-platform layout means that the management platform is provided with a general platform and a plurality of sub-platforms, the plurality of sub-platforms store and process data of different types or data of different receiving objects sent by the service platform, the general platform summarizes data of the plurality of sub-platforms and then stores and processes the data of the plurality of sub-platforms, and transmits the data of the plurality of sub-platforms to the sensor network platform; the centralized layout means that the sensor network platform receives, processes and sends the data in a unified manner; and the object platform is configured as intelligent management equipment;
the control method includes:
the object platforms packaging the data of the product manufacturing problems and sending the data of the product manufacturing problems to the sensor network platform when obtaining the product manufacturing problems;
the sensor network platform receiving the data of the product manufacturing problems and identifying equipment information of a corresponding object platform, compiling the equipment information and the data of the product manufacturing problems into a compilation file in accordance with a compilation rule, and uploading the compilation file to the general platform of the management platform;
the general platform of the management platform receiving the compilation file, extracting out keywords in the data of the product manufacturing problems to form keyword index data, conducting comparative analysis on the keyword index data and a keyword problem association table stored in the general platform of the management platform to find out problem types associated with the keywords, and using one or more problem types as analysis results, the general platform of the management platform storing a problem classification table, and the problem classification table including at least the problem types and the equipment information of sub-platforms of the management platform for solving the corresponding problem types;
when the general platform of the management platform obtains one or more analysis results, the general platform of the management platform obtaining the equipment information of the sub-platforms of the management platform corresponding to the one or more analysis results based on the problem types; and the general platform of the management platform taking the equipment information of the plurality of sub-platforms of the management platform as classification information of the problem types, and sending the compilation file to the plurality of sub-platforms of the management platform in the classification information;
the sub-platforms of the management platform storing databases of the product manufacturing problems, and the databases of the product manufacturing problems including at least the product manufacturing problems and problem processing data corresponding to the product manufacturing problems; when receiving the compilation file, the plurality of sub-platforms of the management platform respectively extracting the data of the product manufacturing problems in the compilation file as matching data; the plurality of sub-platforms of the management platform matching the matching data and the product manufacturing problems in the database of the product manufacturing problem one by one to obtain several similarity matching results, and sending all the matching data with a matching rate meets a matching requirement to the general platform of the management platform;

the general platform of the management platform receiving one or more matching rates, sorting all the matching rates, and selecting N sub-platforms of the management platform with a highest matching rate as problem processing platforms, retrieving problem processing data of corresponding matching rates of all the problem processing platforms, sorting all the problem processing data according to the matching rate and integrating the equipment information in the compilation file to send to the sensor network platform together, wherein N is an integer greater than or equal to 1;

the sensor network platform receiving the problem processing data and the equipment information, and sending all the problem processing data to the corresponding object platform based on the equipment information; and the object platforms obtaining the problem processing data sorted according to the matching rate, using the problem processing data as a corresponding instruction package to execute, and executing a next question processing data according to a descending order of the matching rate when the product manufacturing problems still exist after one problem processing data is executed; when the product manufacturing problems are solved during execution, the object platform using the corresponding problem processing data as processing optimal item data to be transmitted to the sensor network platform and the general platform of the management platform in turn, and the general platform of the management platform obtaining the sub-platforms corresponding to the management platform based on the processing optimal item data; and the general platform of the management platform associating the product manufacturing problems and the problem processing data and sending the product manufacturing problems and the problem processing data to the corresponding sub-platforms of the management platform, and the corresponding sub-platforms of the management platform storing the associated product manufacturing problems and the associated problem processing data to the databases of the product manufacturing problems and feeding back storage information to the general platform of the management platform; and the storage information including at least the product manufacturing problems, the problem processing data, and storage time.

\* \* \* \* \*